United States Patent

[11] 3,619,091

| [72] | Inventor | Barry L. Frost |
| | | Jackson, Mich. |
| [21] | Appl. No. | 23,123 |
| [22] | Filed | Mar. 27, 1970 |
| [45] | Patented | Nov. 9, 1971 |
| [73] | Assignee | Clark Equipment Company |

[54] FLUID PRESSURE DEVICE
13 Claims, 24 Drawing Figs.

[52] U.S. Cl. .................................................... 417/462,
417/214
[51] Int. Cl. .................................................... F04b 19/02
[50] Field of Search .......................................... 417/462,
204, 214; 91/496

[56] References Cited
UNITED STATES PATENTS
2,117,573  5/1938  Rawls .......................... 418/255

| 2,651,999 | 9/1953 | Harrington | 417/462 |
| 1,488,170 | 3/1924 | Sandoz | 417/462 |
| 1,936,614 | 11/1933 | Ballman | 417/462 |
| 2,470,220 | 5/1949 | Mott | 91/496 |

FOREIGN PATENTS

| 814,238 | 7/1949 | Germany | 417/462 |
| 500,769 | 6/1930 | Germany | 417/462 |

*Primary Examiner*—William L. Freeh
*Attorneys*—Kenneth C. Witt, John C. Wiessler, Robert H. Johnson and Reginald J. Falkowski ABSTRACT: A fluid pressure device of the ball piston type wherein a locating rod is provided to define a minimum distance between opposing ball pistons, insuring that a ball piston will not stick in an inoperative position. A slidable dividing member may be releasably located in a central position between opposing fluid chambers so that the volume of each fluid chamber may remain constant during operation if required to do so by inlet or outlet fluid flow restrictions.

PATENTED NOV 9 1971 3,619,091

INVENTOR
BARRY L. FROST

BY *Robert H. Johnson*

ATTORNEY

3,619,091

FLUID PRESSURE DEVICE

BACKGROUND OF THE INVENTION

This invention relates to a fluid pressure device of the ball piston type.

In many types of rotating machinery, and commonly in mechanical power transmissions, a ball piston type fluid pump is provided within a rotating shaft to supply a flow of lubricant to bearings, gears, and other components requiring lubrication. Contaminants may become lodged within the working chambers of this type fluid pump and cause a ball piston to become stuck in an inoperative position. During conditions of high-lubricant viscosity, such as may occur during initial operation at low temperatures, a positive displacement fluid pump of this type is subjected to excessive mechanical forces.

A principal object of my invention is to provide an improved fluid device wherein sticking of the ball pistons is prevented and wherein the volume of opposing fluid chambers may remain constant when so required by viscous effects or outlet flow restrictions.

SUMMARY OF THE INVENTION

In carrying out my invention in one preferred embodiment thereof, I provide a ball pump wherein the working fluid chambers are defined by the walls of a cross bore through a rotatable body member, reciprocal ball pistons at the extremities of the cross bore, and a slidable dividing member within the cross bore. The dividing member is releasably held in a central position between the reciprocal ball pistons to divide the cross bore into two opposing fluid chambers, but it may move axially within the cross bore. I also provide a locating rod along the axis of the cross bore, the ends of which are closely adjacent to the ball pistons. The locating rod passes longitudinally through the dividing member in sliding fluid-sealing contact therewith.

The above and other objects, features and advantages of my invention will be more readily understood by persons skilled in the art when the following detailed description is taken in conjunction with the drawing.

DESCRIPTION OF PREFERRED EMBODIMENT

Figure 1:
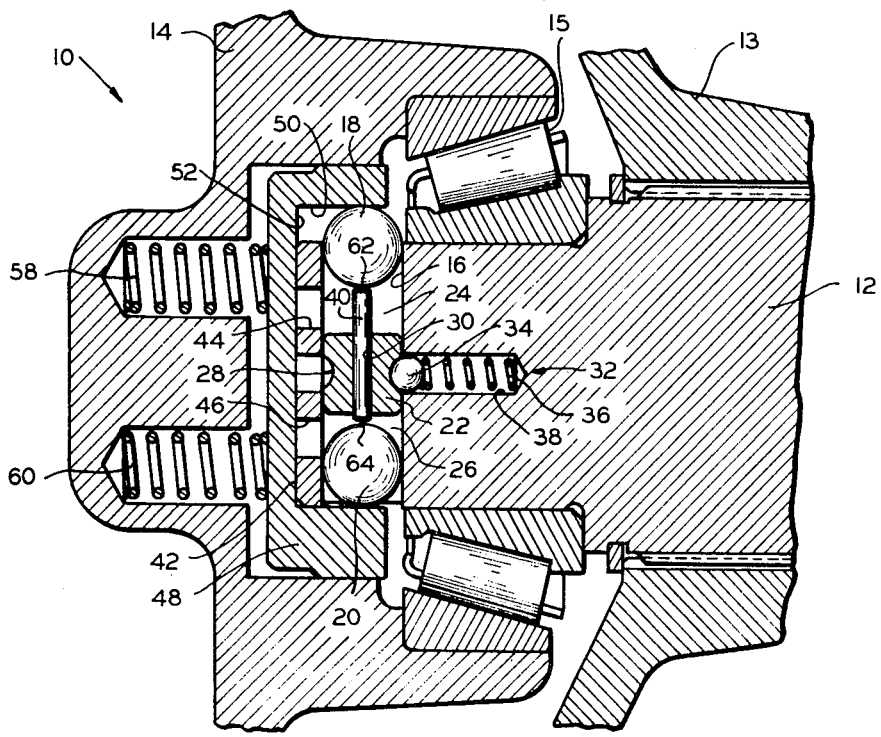
FIG. 1 shows a ball pump in accordance with an embodiment of this invention.

Referring to FIG. 1, the reference numeral 10 denotes generally a ball pump comprising a rotatable body member or shaft 12 and an outer casing 14. Ball pump 10 may be the lubricant pump in a mechanical power transmission with shaft 12 being geared to various power imputs or takeoffs, such as a gear 13, and rotatably supported in the transmission outer casing 14 by bearings such as the thrust bearing 15. Body member or shaft 12 includes a cross bore 16 therethrough within which are disposed axially spaced-apart ball pistons 18 and 20. Slidably disposed between ball pistons 18 and 20 in fluid-sealing contact with cross bore 16 is a dividing member 22 that defines with cross bore 16 and pistons 18 and 20 a pair of opposed fluid chambers 24 and 26.

Dividing member 22 has a circumferential groove 28 thereon, and a longitudinal bore 30 therethrough. Dividing member 22 is releasably held in a central position by a retaining means 32 that, as illustrated, includes a ball detent 34 biased into engagement with circumferential groove 28 by a spring 36. Ball detent 34 and spring 36 are contained within an axial bore 38 in body member 12 with ball detent 34 protruding sufficiently from axial bore 38 to engage circumferential groove 28.

Slidably disposed in fluid-sealing contact through longitudinal bore 30 is a locating rod 40. Locating rod 40 is of such a length that its ends are closely adjacent to ball pistons 18 and 20.

Body member 48 has a valving surface 42 thereon and transverse openings 44 and 46 therethrough. Opening 44 communicates with fluid chamber 24 and opening 46 communicates with fluid chamber 26.

Figure 2:
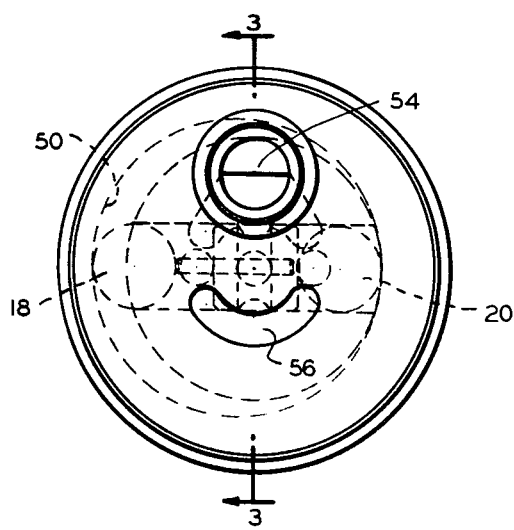
FIG. 2 shows an end view of the ball pump of FIG. 1 rotated 90°, with the outer casing removed.
Figure 3:
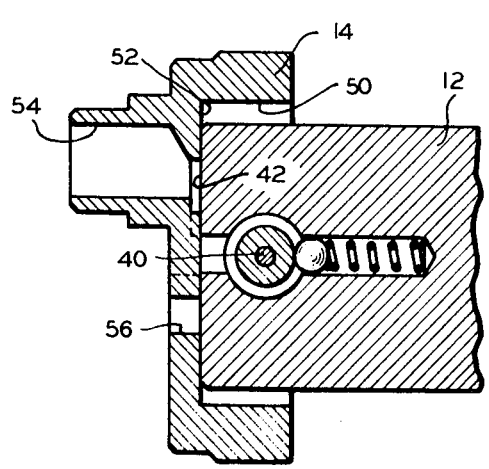
FIG. 3 shows a sectional view taken along line 3—3 of FIG. 2.

Outer casing 14 includes a nonrotating member 48 therein having an eccentric ball race 50 and valving surface 52 thereon. Eccentric ball race 50 provides means in this embodiment for reciprocally driving ball pistons 18 and 20 when body member 12 is rotated therein. Nonrotating member 48 includes, as shown in FIG. 2, a fluid inlet port 54 and a fluid exit port 56 therethrough that alternately communicate with openings 44 and 46 to provide means for fluid entry and fluid exit from fluid chambers 24 and 26. Means are provided for loading nonrotating member 48 so that valving surface 52 is maintained in fluid-sealing contact with valving surface 42, which means, as illustrated, comprises a pair of springs 58 and 60.

In order to enable persons skilled in the art to better understand my invention, I will now explain the operation of it.

During operation, body member 12 rotates in relation to outer casing 14. The forces created by the rotation of body member 12 cause the ball pistons 18 and 20 to move radially outward into rolling contact with eccentric ball race 50. As body member 12 rotates through one revolution in relation to eccentric ball race 50, ball pistons 18 and 20 are required to move radially into and out of cross bore 16. In this embodiment eccentric ball race 50 is circular and it will be understood that as ball piston 20 is moving radially outward, ball piston 18 is moving radially inward so that an approximately constant distance is maintained between the ball pistons.

Reference will now be made to the operation of fluid chamber 24, but it will be understood that the operation of fluid chamber 26 is similar. As ball piston 18 moves radially inward within cross bore 16 from its apogee toward its perigee fluid chamber 24 is reduced in volume and the working fluid contained therein is pressurized. During this compression mode of fluid chamber 24 opening 44 rotates into communication with fluid exit port 56 and the working fluid is forced out of chamber 24 through opening 44 and exit port 56. As ball piston 18 moves radially outward within cross bore 16 from its perigee toward its apogee fluid chamber 24 is increased in volume. During this intake mode of fluid chamber 24 opening 44 rotates into communication with inlet port 54 and working fluid is drawn into the chamber.

During normal pumping operation, dividing member 22 is held in its central position by retaining means 32. If the pump is operated during conditions of high-fluid viscosity, such as might occur in the course of initial operation at low temperatures, the free flow of fluid into and out of fluid chambers 24 and 26 is restricted. The excessive fluid pressure that results from this restriction of flow acts upon dividing member 22, causing it to be released from retaining means 32 and move along the axis of cross bore 16. As body member 12 rotates, dividing member 22 will periodically translate across retaining means 32 to compensate for alternate excessive pressure conditions in fluid chambers 24 and 26. The frictional heat created by the translation of dividing member 22 will be absorbed by the fluid within chambers 24 and 26 until the fluid viscosity is sufficiently low to allow for discharge. Upon the establishment of normal operating temperatures, and hence viscosities, the excessive pressure conditions will be alleviated and dividing member 22 will again be retained in its central position by retaining means 32.

A locating rod 40 is provided that defines a minimum distance between ball piston 18 and ball piston 20. As the ball pistons reciprocate within cross bore 16, locating rod 40 is urged by the inwardly moving ball piston to translate through longitudinal bore 30, being urged first by ball piston 18 toward ball piston 20 and then by ball piston 20 toward ball piston 18. If contaminants cause either ball piston 18 or ball piston 20 to become stuck at an inward or inoperative position within cross bore 16 locating rod 40 provides a positive means for urging the stuck ball piston back into reciprocal operation. To illustrate, assume that ball piston 20 has become stuck at the inward position shown in FIG. 1 of the drawing. As ball piston 18 is forced inward within cross bore 16 by eccentric ball race 50, it will engage locating rod 40 at its adjacent end indicated generally by the numeral 62. Locating rod 40 will now be required to translate through longitudinal bore 30 into engagement with ball piston 20 at the adjacent end indicated generally by the numeral 64. Ball piston 20 is thereupon urged outwardly into the resumption of proper reciprocal operation.

Figure 4:
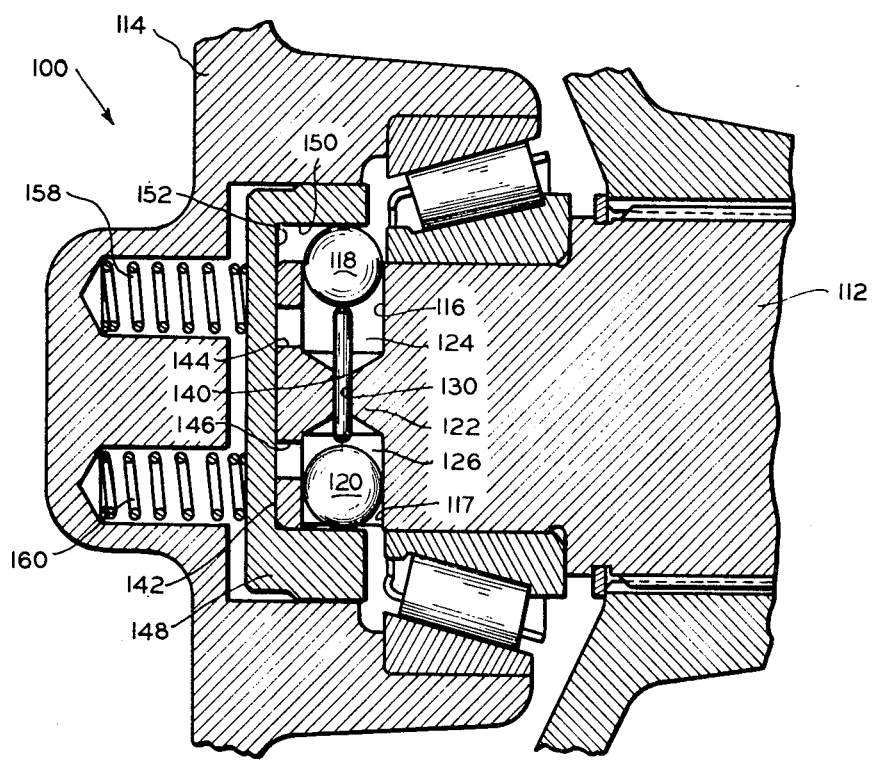
FIG. 4 shows a ball pump in accordance with another embodiment of this invention.

Referring to FIG. 4, another embodiment of the invention is shown wherein the reference numeral 100 denotes generally a ball pump that is similar to ball pump 10 previously explained. Ball pump 100 comprises an outer casing 114 and a rotatable body member 112 having transverse coaxial bores 116 and 117 therein. Bores 116 and 117 are not of sufficient depth to intersect or meet and, therefore, a dividing portion 122 of body member 112 is disposed between the ends of bore 116 and bore 117. The ball piston 118 is slidably disposed within bore 116 to define with the walls of bore 116, a fluid chamber 124 that is operatively opposed to a fluid chamber 126 defined by bore 117 and the ball piston 120 slidably disposed therein.

Substantially coincident with the axes of bores 116 and 117 is a step bore 130 through dividing portion 122 that is adapted to receive a locating rod 140 therethrough in sliding fluid sealing contact. Locating rod 140 is of such a length that its ends are closely adjacent ball pistons 118 and 120.

Body member 112 has a valving surface 142 thereon and openings 144 and 146 therethrough. Opening 144 communicates with fluid chamber 124 and opening 146 communicates with fluid chamber 126.

Outer casing 114 includes a nonrotating member 148 therein having an eccentric ball race 150 and valving surface 152 thereon. Eccentric ball race 150 provides means in this embodiment for reciprocally driving ball pistons 118 and 120 when body member 112 is rotated therein. Nonrotating member 148 provides means for fluid entry and fluid exit from fluid chambers 124 and 126 that comprises ports similar to those explained in conjunction with nonrotating member 48 of FIG. 1. Means are provided for loading nonrotating member 148 so that valving surface 152 is maintained in fluid sealing contact with valving surface 142, which means, as illustrated, comprises a pair of springs 158 and 160.

The operation of the embodiment of FIG. 4 is similar to the operation of the embodiment of FIG. 1 with distinctions that will be easily understood by those skilled in the art. The operation of locating rod 140 is similar to that of locating rod 40 and it will be understood that locating rod 140 provides means in the embodiment of FIG. 4 for preventing either ball piston 118 or ball piston 120 from becoming stuck in an inward or inoperative position.

While I have described and illustrated herein preferred embodiments of my invention, it will be appreciated that modifications may be made therein. Therefore, it should be understood that I intend to cover all such modifications which fall within the spirit and scope of my invention.

I claim:

1. A fluid pressure device comprising, a body member, a cross bore in said body member, first and second axially spaced-apart pistons disposed within said cross bore, means for reciprocally driving said pistons within said cross bore, a dividing member slidable relative to said cross bore and disposed in said cross bore between said pistons, said dividing member defining with said cross bore and said pistons two opposing fluid chambers, and means for releasably retaining said dividing member in a substantially central position in said cross bore.

2. A fluid pressure device according to claim 1 wherein said retaining means includes a detent, a circumferential groove on said dividing member, and a biasing spring, said biasing spring urging said detent into engagement with said circumferential groove.

3. A fluid pressure device according to claim 1 including a casing having an eccentric ball race therein and an inlet and an outlet port therethrough, wherein said body member is rotatably disposed within said eccentric ball race, said pistons being balls that project axially from said cross bore into rolling contact with said eccentric ball race, said eccentric ball race imparting reciprocal movement to said pistons when said body member is rotated within said ball race, said body member having a first opening therethrough communicating with one of said fluid chambers and a second opening therethrough communicating with the other of said fluid chambers, said first and said second openings alternately communicating with said inlet port and said outlet port for the transmission of fluid into and out of said fluid chambers when said body member is rotated within said eccentric ball race.

4. A fluid pressure device according to claim 3 wherein said retaining means includes a detent, a circumferential groove on said dividing member, and a biasing spring, said biasing spring urging said detent into engagement with said circumferential groove.

5. A fluid pressure device according to claim 1 wherein said dividing member has a longitudinal bore therethrough, a locating rod disposed through said longitudinal bore in sliding fluid sealing contact, the ends of said locating rod being disposed closely adjacent said pistons so that said locating rod maintains a minimum distance between said pistons.

6. A fluid pressure device comprising a body member, a cross bore in said body member, first and second axially spaced apart pistons disposed within said cross bore, means for reciprocally driving said pistons within said cross bore, a dividing member slidably disposed in said cross bore between said pistons, said dividing member defining with said cross bore and said pistons two opposing fluid chambers, said dividing member having a longitudinal bore therethrough, a locating rod disposed through said longitudinal bore in sliding fluid sealing contact, the ends of said locating rod being disposed closely adjacent said pistons so that said locating rod maintains a minimum distance between said pistons.

7. A fluid pressure device according to claim 6 including a casing having an eccentric ball race therein and an inlet and an outlet port therethrough, wherein said body member is rotatably disposed within said eccentric ball race, said pistons being balls that project axially from said cross bore into rolling contact with said eccentric ball race, said eccentric ball race imparting reciprocal movement to said pistons when said body member is rotated within said ball race, said body member having a first opening therethrough communicating with one of said fluid chambers and a second opening therethrough communicating with the other of said fluid chambers, said first and said second openings alternately communicating with said inlet port and said outlet port for the transmission of fluid into and out of said fluid chambers when said body member is rotated within said eccentric ball race.

8. A fluid pressure device according to claim 5 wherein said retaining means includes a detent, a circumferential groove on said dividing member, and a biasing spring, said biasing spring urging said detent into engagement with said circumferential groove.

9. A fluid pressure device according to claim 8 including a casing having an eccentric ball race therein and an inlet and an outlet port therethrough, wherein said body member is rotatably disposed within said eccentric ball race, said pistons being balls that project axially from said cross bore into rolling contact with said eccentric ball race, said eccentric ball race imparting reciprocal movement to said pistons when said body member is rotated within said ball race, said body member having a first opening therethrough communicating with one of said fluid chambers and a second opening therethrough communicating with the other of said fluid chambers, said first and said second openings alternately communicating with said inlet port and said outlet port for the transmission of fluid into and out of said fluid chambers when said body member is rotated within said eccentric ball race.

10. For use with a device having a casing and a shaft journaled for rotation in the casing, the combination comprising an eccentric ball race in the casing, an inlet and an outlet port through the casing, a cross bore in the shaft, first and second axially spaced-apart ball pistons disposed within said cross bore, a dividing member slidable relative to said cross bore and disposed in said bore between said ball pistons, said dividing member defining with said cross bore and said pistons two opposing fluid chambers, means for releasably retaining said dividing member in a substantially central position in said cross bore, said pistons projecting axially from said cross bore into rolling contact with said eccentric ball race, said eccentric ball race imparting reciprocal movement to said pistons when the shaft is rotated within the casing, the shaft having a first opening therethrough communicating with one of said fluid chambers and a second opening therethrough communicating with the other of said fluid chambers, said first and said second openings alternately communicating with said inlet port and said outlet port for the transmission of fluid into and out of said fluid chambers when the shaft is rotated within said eccentric ball race.

11. A fluid pressure device according to claim 10 wherein said retaining means includes a detent, a circumferential groove on said dividing member, and a biasing spring, said biasing spring urging said detent into engagement with said circumferential groove.

12. The combination as set forth in claim 10 wherein said dividing member has a longitudinal bore therethrough, a locating rod disposed through said longitudinal bore in sliding fluid sealing contact, the ends of said locating rod being disposed closely adjacent said pistons so that said locating rod maintains a minimum distance between said pistons.

13. A fluid pressure device according to claim 12 wherein said retaining means includes a detent, a circumferential groove on said dividing member, and a biasing spring, said biasing spring urging said detent into engagement with said circumferential groove.

* * * * *

UNITED STATES PATENT OFFICE
CERTIFICATE OF CORRECTION

Patent No. 3,619,091          Dated November 9, 1971

Inventor(s) Barry L. Frost

It is certified that error appears in the above-identified patent and that said Letters Patent are hereby corrected as shown below:

Cover Sheet - Item [54] should read:
    FLUID PRESSURE DEVICE
    13 Claims, 4 Drawing Figs.

Column 2, line 5 the numeral "48" should be -- 12 --

Signed and sealed this 2nd day of May 1972.

(SEAL)
Attest:

EDWARD M. FLETCHER, JR.
Attesting Officer

ROBERT GOTTSCHALK
Commissioner of Patents